Jan. 12, 1971 — E. G. BOEHM — 3,553,908

WORKPIECE POSITIONING APPARATUS

Filed March 12, 1968 — 5 Sheets-Sheet 1

INVENTOR
E. G. BOEHM
BY
Sommers & Sommers
ATTORNEYS

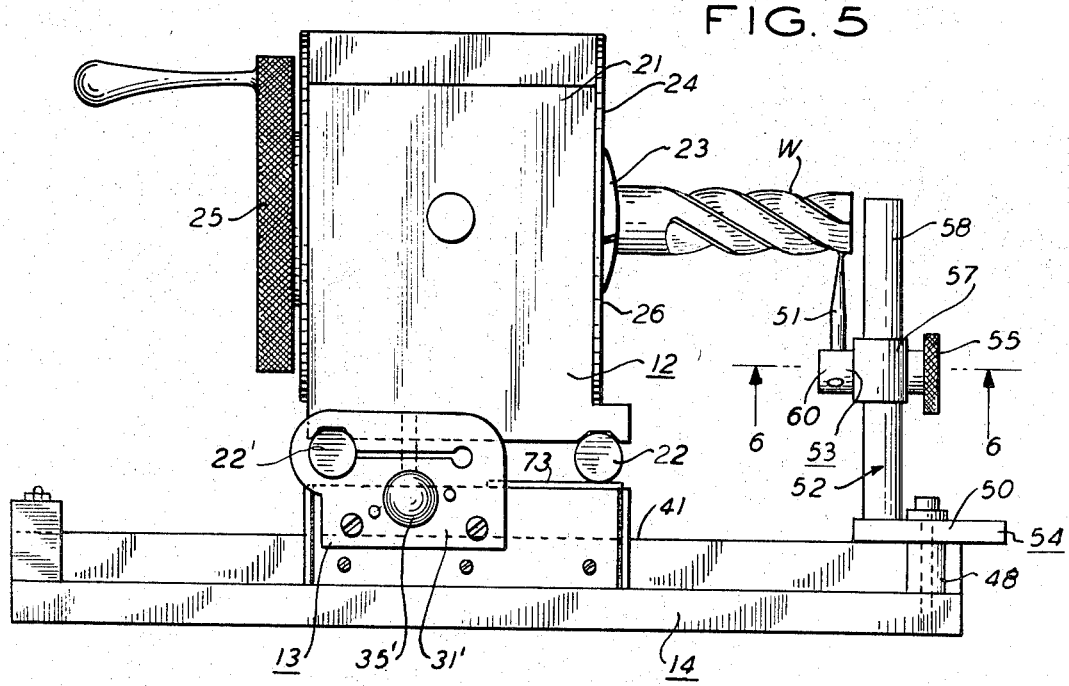
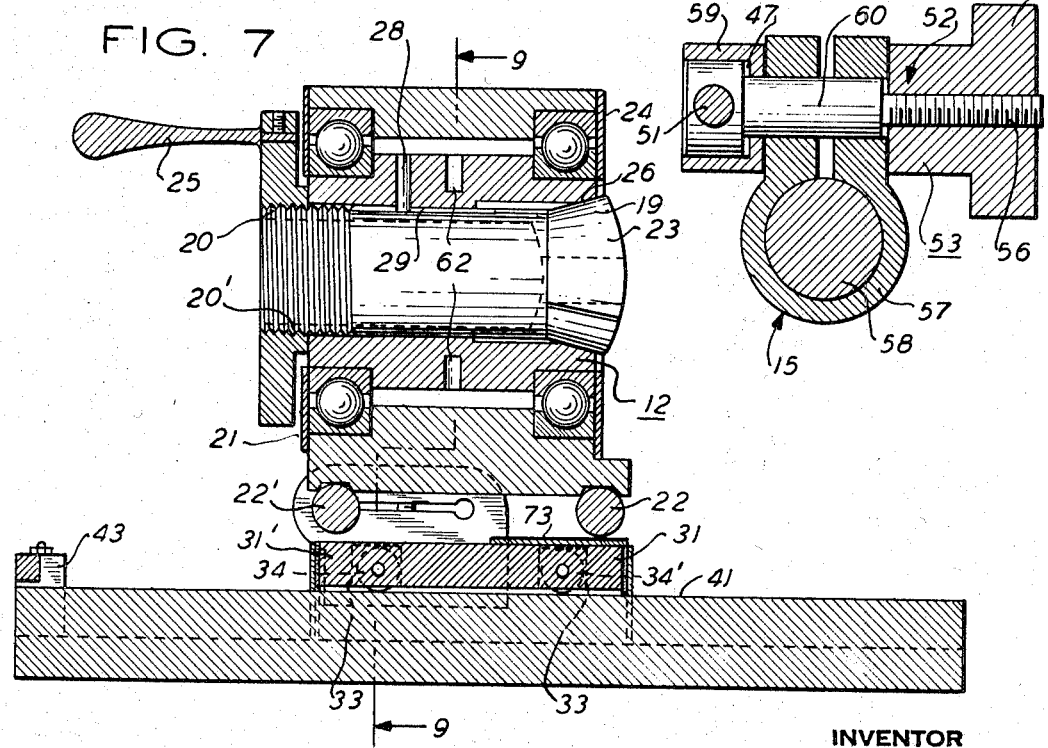

Jan. 12, 1971   E. G. BOEHM   3,553,908

WORKPIECE POSITIONING APPARATUS

Filed March 12, 1968   5 Sheets-Sheet 4

INVENTOR
E. G. BOEHM
BY
Sommers & Sommers
ATTORNEYS

Jan. 12, 1971     E. G. BOEHM     3,553,908
WORKPIECE POSITIONING APPARATUS
Filed March 12, 1968     5 Sheets-Sheet 5
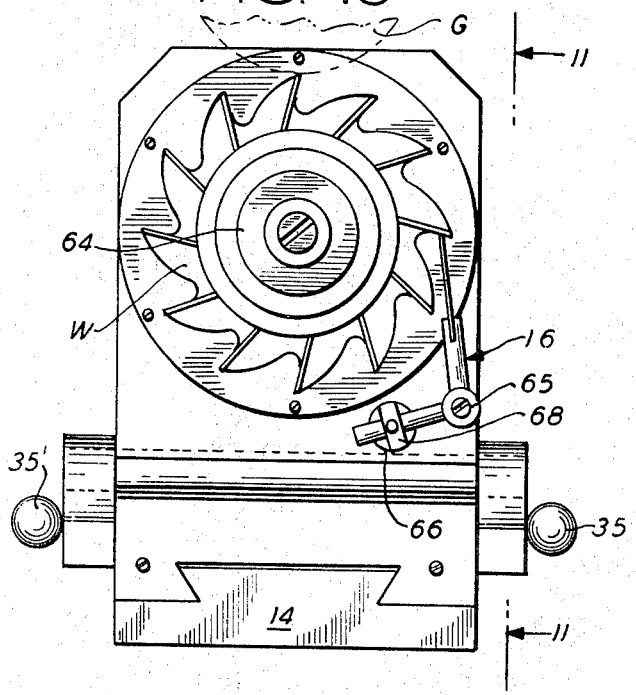
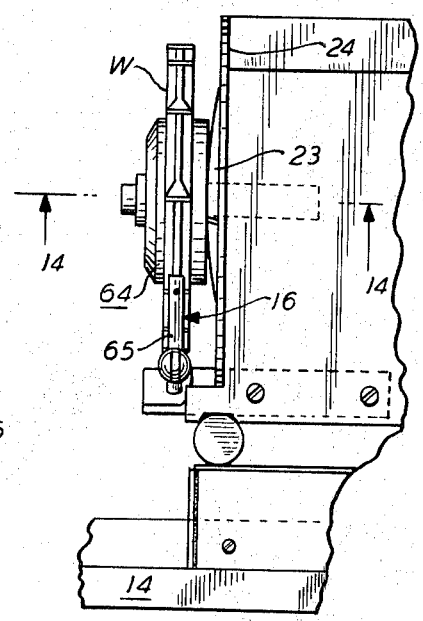
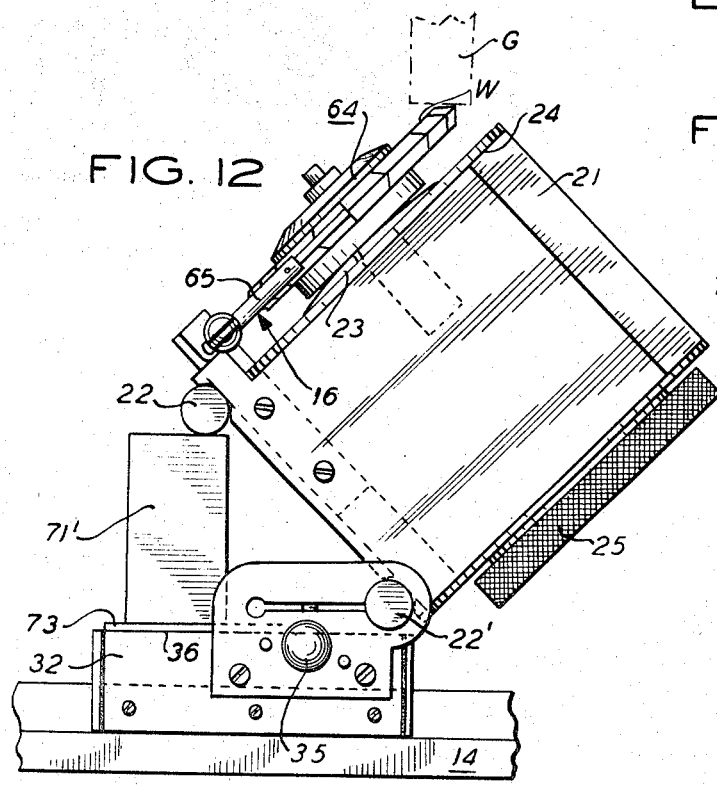
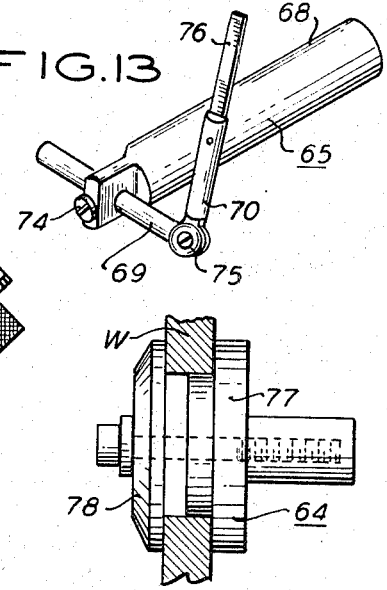
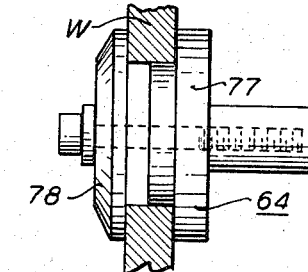
INVENTOR
E. G. BOEHM
BY
*Sommers & Sommers*
ATTORNEYS United States Patent Office 3,553,908
Patented Jan. 12, 1971

3,553,908
WORKPIECE POSITIONING APPARATUS
Eugene G. Boehm, 440 Meisel Ave.,
Springfield, N.J. 07081
Filed Mar. 12, 1968, Ser. No. 712,554
Int. Cl. B24b 41/06
U.S. Cl. 51—216                                    11 Claims

ABSTRACT OF THE DISCLOSURE

In an apparatus for positioning and supporting workpieces, a movable mounting and positioning system with structural features, permitting easy and simplified relative positioning of the article and the grinding apparatus, enabling simplified and accurate support and positioning of the article to permit shaping as desired, and enabling simplified and accurate movement of the article to present other surfaces to the cutter or grinder.

WORKPIECE POSITIONING APPARATUS

Figure 1:
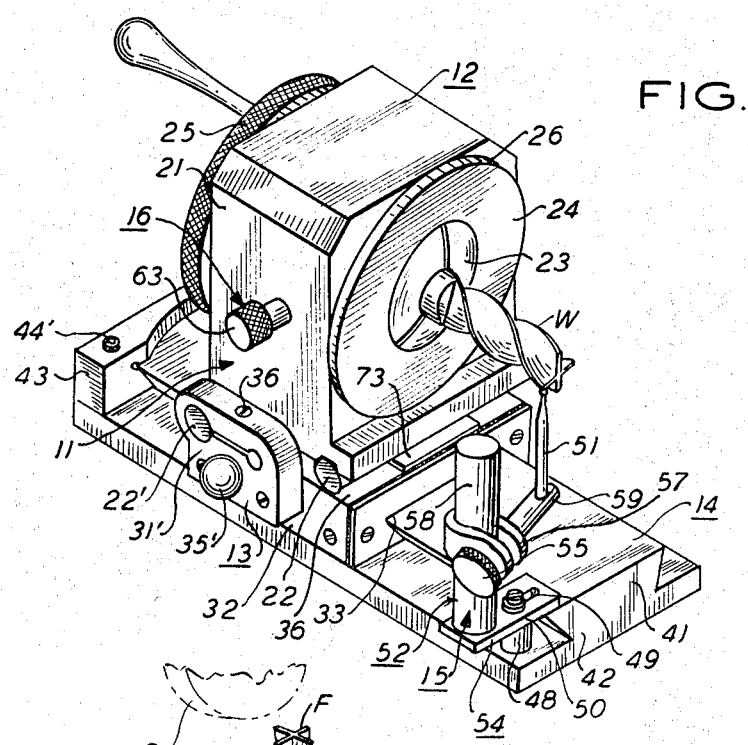

This invention relates to the positioning and supporting of articles such as workpieces, and more particularly to a support and positioning system which enables the simple convenient and accurate positioning of the workpiece in the work support, and the accurate positioning of the workpiece to permit accurate shaping or grinding of the workpiece in the desired fashion.

Pursuant to the invention the positioning and operating system of the positioning and supporting apparatus is one which utilizes movable workpiece support members and movable positioning members. The system permits simple and accurate presetting of the piece to be worked, in a movable and adjustable support, and of the positioner in its adjustable support, to permit positioning the workpiece for grinding or cutting thereof into the desired shape. Further, the system may be utilized to support workpieces for grinding thereof into tapered or other specialized shapes and to position workpieces having a multiplicity of edges of various numbers to be worked.

Devices proposed for this purpose heretofore have generally been objectionable due to their complexity and high cost of initial manufacture, and the requirement for substantial maintenance. These objections in devices heretofore proposed have been eliminated in the positioning and supporting apparatus of this invention.

Figure 2:
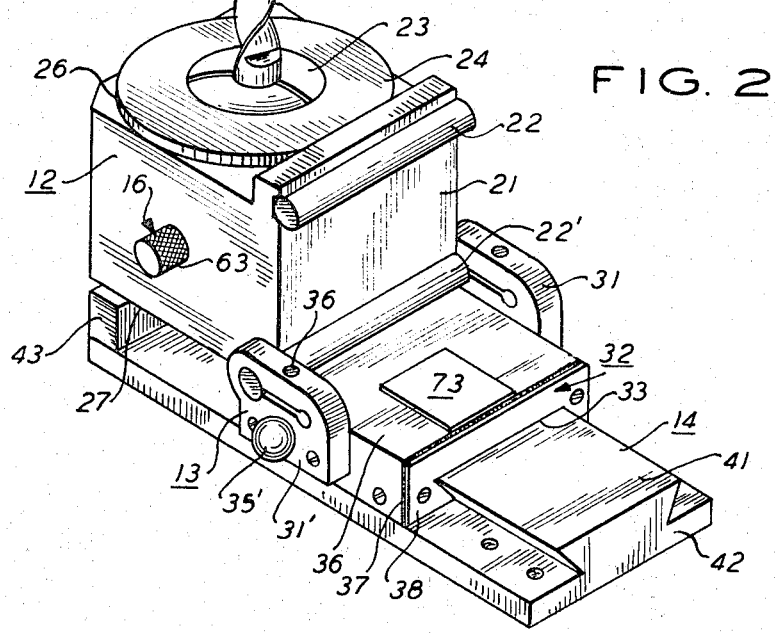
Figure 3:
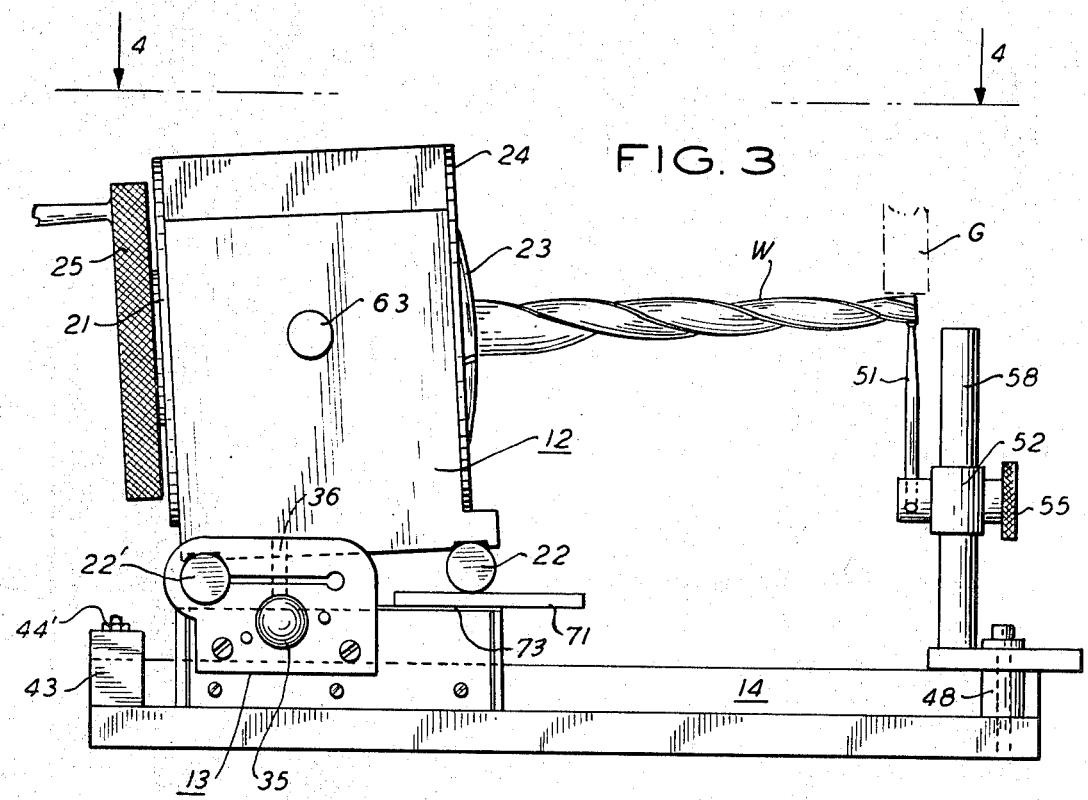
Figure 4:
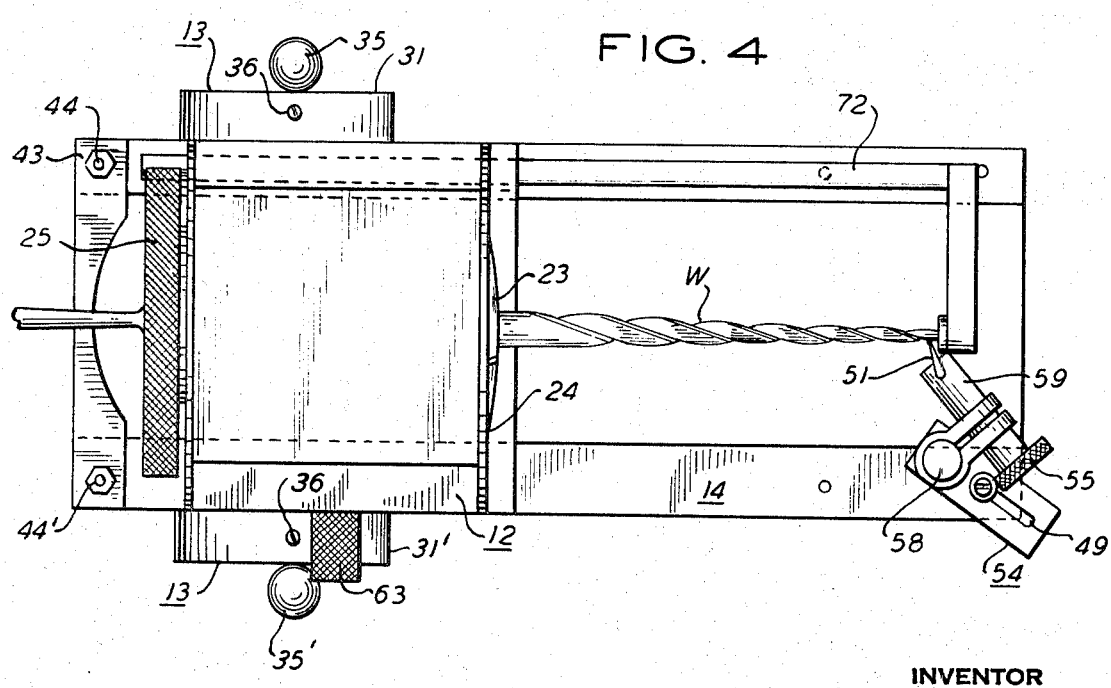

In the drawings wherein similar reference characters indicate like parts:

FIG. 1 is an isometric elevational view of a workpiece in a positioning and supporting apparatus embodying the invention, FIG. 2 is a similar view of the parts, shown in another position, FIG. 3 is a side elevational view, showing an inclined positioning of the workpiece, for working thereof pursuant to the invention, FIG. 4 is a top plan view thereof, taken at line 4—4 of FIG. 3, FIG. 5 is a side elevational view of the invention prior to operation on the workpiece.

Figure 8:
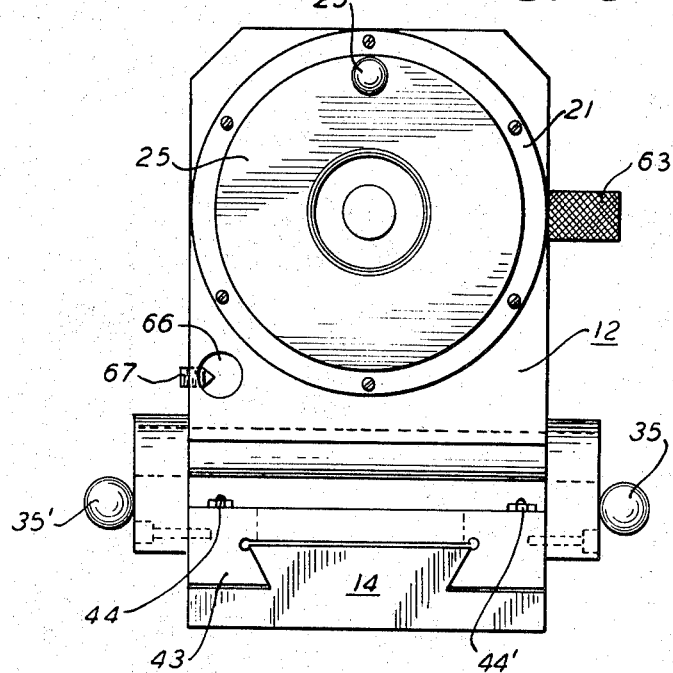
Figure 9:
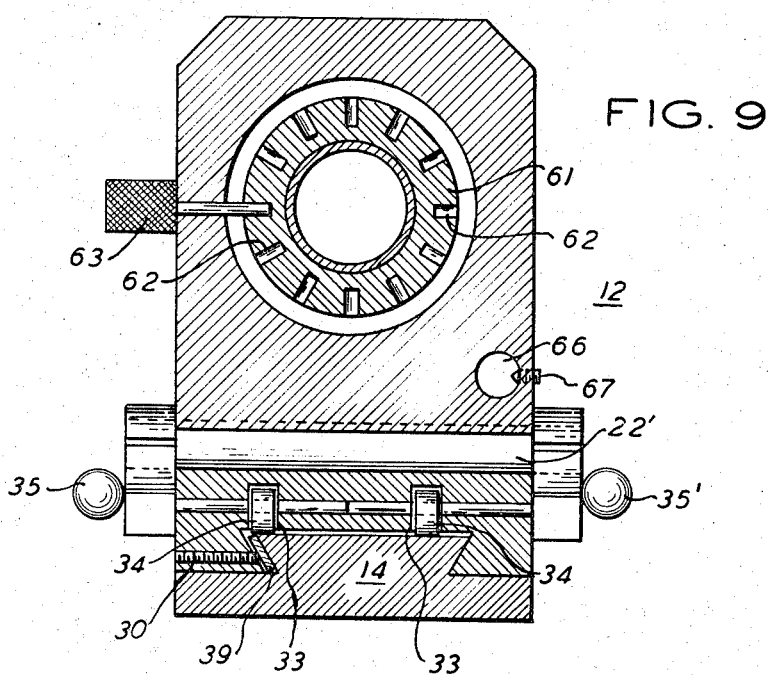

FIG. 6 is a sectional view, taken at line 6—6 of FIG. 5,

FIG. 7 is a longitudinal vertical sectional view of the positioning member as shown in FIG. 5, FIG. 8 is a front elevational view thereof, FIG. 9 is a transverse sectional view taken at line 9—9 of FIG. 7, FIG. 10 is a front elevational view of a workpiece indexing means embodying the invention, FIG. 11 is a side elevational view thereof, taken at line 11—11 of FIG. 10, FIG. 12 is a side elevational view showing an inclined indexing means used in connection with the invention, FIG. 13 is an isometric view of an indexing member which may be used with the invention, FIG. 14 is a partly sectional, elevational view, taken at line 14—14 of FIG. 11.

As will be seen from the drawings forming part hereof, this invention relates to a positioning and supporting apparatus having features as will be described below, such that workpieces can be positioned simply, easily and accurately for forming the same to the desired shape, and indexed and moved about into position to work as many surfaces and angles of the workpiece as is desired.

The workpiece positioning apparatus 11 (FIG. 1) may, for example, comprise a chuck member 12, movable mounting means 13, a base rail or guideway member 14, positioning means 15, and indexing means 16. The chuck member 12 (FIGS. 1 and 2) comprises a chuck block 21 having an aperture 26 therein, leg support members 22 and 22', chuck or collet 23 chuck holder or frame 24, and frame handle 25. Chuck block 21 can rotate about the (pivot) leg support member 22' (FIG. 2) in the movable mounting means or slide member 13.

The movable mounting means 13 (FIGS. 1 and 2) is comprised of side members 31 and 31', mounting guide member 32, opening 33, roller means 34 and 34' (FIG. 7), and knobs 35 and 35' (FIG. 4).

The base guideway member 14 is comprised of guideway portion 41 (FIGS. 1 and 2) which is complementary in shape to the opening 33 in the mounting guide member 32, base portion 42, and a rear stop portion 43.

The positioning means 15 (FIGS. 1 and 6) consists of a head member 51 and an adjustable support member 52. The indexing means 16 (FIGS. 1 and 9–14) is comprised of an index wheel 61 (FIG. 9), index apertures 62, and an indexing key 63, and (FIGS. 10–14) a workpiece support frame or arbor 64 (FIG. 12) and an indexing member 65. The sine bar member 71 (FIG. 3) and 71' (FIG. 12) can be of various dimensions to position the workpiece at precisely the desired angle or incline to the horizontal for work by a grinder wheel or other tooling device. The support bar 72 (FIG. 4) can be used to position and stabilize the workpiece W for facility of handling special (for example) work.

In operation (FIGS. 1 and 5) for example, the workpiece W is positioned in the chuck 23 (which is seated in the aperture 26 in the rotatable chuck holder 24) of the chuck block 21 and locked therein by rotation of the handle 25 (due to interengaging threads 20, 20' or other means). When the workpiece W is so positioned, the head member 51 is positioned in the adjustable support member 52 at the proper angle to engage and position the workpiece for the desired work.

The pin 28 (FIG. 7) in the chuck holder 21 may be tightened on the guide slot 29 to prevent the rotational turning of the chuck 23, thereby holding the workpiece W tightly in place, while still permitting the chuck 23 to move in and out along the guide slot 29 on rotation of the frame handle 25 (whereby the jaws 19 of the chuck 23 are loosened or tightened on the workpiece W).

The support member 52 can be adjusted to position the head member 51 as desired with respect to the workpiece W (FIGS. 1, 5 and 6) by vertical or angular movement in the upper frame 53 or by horizontal movement in the lower frame 54. The adjustable support member 52 is best operated by positioning of the head member 51 directly under, or as perpendicularly as possible with relation to the workpiece, to permit cutting or grinding of the workpiece. The upper frame 53 is fixed in position (FIG. 6) by tightening the cover member 55 on the threaded connector 56, which will thereby tighten the jacket portion 57 about the tubular portion 58 and which will pull the end member 59 toward the jacket portion 57. There will, preferably be a relative positioning of the parts based on size of the head holder member 60 to allow a space 47 between the head member 51 and the end member 59, thereby enabling the force on the head member 51 (due to pressure of the workpiece W being moved thereon) to be transmitted through the sturdier support structure of the head holder member 60 rather than through the end member 59. The lower frame member 54 (FIGS. 1 and 5) is maintained in position by tightening the tubular threaded connector member 48, in the aperture 49 of the slide holder 50, onto the base guideway member 14.

The workpiece can be worked, for example (FIG. 1) by moving the chuck member 12 on the base guideway member 14 on grasping and pushing the knobs 35 and 35' on the side members 31 and 31' of the movable mounting means 13. As these knobs 35 and 35' are pushed, the chuck member 12 moves by means of the movable mounting means 13 along the base guideway member 14. This movement is aided by the roller means 34 and 34' (FIGS. 7 and 9) (preferably two on each side) which roll along the top of the guideway portion 41 of the base guideway member 14 and by the smooth surface of the guideway portion 41, such that movement is very smooth, easy, fast and efficient. The movement of the check member 12 along the base guideway member 14 is continued until the workpiece has been shaped as desired on the first run. Then the chuck member 12 can be returned along the base guideway member 14 to a position at or near the rear stop portion 43, at which point, if the indexing means 16 is being employed for rectilinear grinding, the indexing key 63 may be retracted, the index wheel 61 turned, and the index key 63 repositioned in another index aperture 62 of the index wheel 61, thereby permitting work by grinder G on the workpiece W at another surface thereof. When the indexing means 16 is not employed, the index key 63 is not inserted in one of the apertures 62 and the positioning means 15 is employed to engage and position the workpiece in a known manner.

Another form of the invention is shown in FIGS. 10–14 wherein the indexing member 65 is positioned in the aperture 66 of chuck member 12 (FIG. 9) so as to be movable into and out of contact with edges of the workpiece W by rotational movement of the workpiece W in its support frame or mandrel 64, which in turn is supported in the chuck 23 of the chuck block 21. The movement on the indexing member 65 allows positioning and support for operation on any size workpiece with any number of edges thereon. The indexing member 65 is positioned in the chuck block 21 by rotation of the leg member 68 (FIGS. 10 and 13) in the aperture 66 and the setting of same therein by tightening the retainer screw 67 (FIGS. 8 and 9), then moving the body member 69 as desired and setting same by screw means 74; and then rotating the holder member 70 and setting same by screw means 75. Thus the flexible index arm member 76, which is fixed to the holder member 70, can be positioned in the aperture 66. On rotational movement of the workpiece W, other edges of the workpiece can be presented to the operating tool G, while the indexing member 65 bears on an edge of the workpiece and thereby supports same, allowing proper working on the desired edge. The workpiece support frame 64 may comprise (FIG. 14) a reduced shoulder washer 77 and a locking screw member 78 which retains the workpiece in proper position.

The head member 51, in one mode of operation, may serve as a guide to key into the involute portions of the workpiece W, as same moves along the base guideway member 14 in the chuck member 12 on the movable mounting means 13, thereby permitting the workpiece W to move forward and rotate in supported position for working thereon by a fixed operating tool.

A pad 37 (FIGS. 1–2) made for example out of felt, is sandwiched between a front plate 38 and the remaining portion of the mounting guide member 32 and serves to clean (by sweeping movement) the top of the guideway portion 41 as the movable mounting means 13 is moved along the base guideway member 14. The pad 37 maintains a clean guideway surface to permit easy rapid movement therealong by preventing dust accumulation from blocking the movement of the rollers 34 and 34'.

The movable mounting means 13 can be locked in position on the base guideway member 14 for work on the workpiece by grinder G (FIGS. 5 and 9) by tightening set screw means 30 on the set place member 39 (which is a separate piece from the guideway portion 41 in order that setting of the screw means 30 will not scratch the guideway portion 41).

The workpiece W can be worked on the front edge F thereof (FIG. 2) by rotating the chuck member 12 on the leg support member 22' so that the back edge 27 of the chuck block member 21 rests on the stop screws 44, 44' (FIG. 4) on the rear stop portion 43 of the base guideway member 14.

A block 73 (FIGS. 1, 2, 5 and 7) is fixed to the top surface 36 of the mounting guide member 32. This block 73 is a smooth finished piece and serves as a small accurate surface for the leg support member 22 to rest on, thereby presenting an accurately level surface to the leg support member 22 and eliminating the necessity for costly inefficient and lengthy finishing of the entire top surface 36 of the mounting guide member 32.

The workpiece W may be shaped in a tapered fashion by placing the spacer block or sine bar member 71 (FIG. 3) or 71' (FIG. 12) in position, on top of the block 73 on the top surface 36 of the mounting guide member 32, under the leg support member 22, such that the workpiece W is held in a position at the desired incline to the horizontal for tapered work by the operating tool G. The taper support bar 72 (FIG. 4) will hold the workpiece W and prevent its movement or wobbling while the working operation is going on.

The workpiece positioning apparatus of my invention may be made simply and inexpensively and will be durable and long lasting in use. The ease of operation of the positioning and supporting apparatus of my invention provides an efficient and simple device for use as a support and positioner for the cutting, sharpening, and grinding, of workpieces.

The foregoing disclosure of exemplary embodiment is made in accordance with the patent statutes. It is to be understood that the invention is not to be limied thereto or thereby, the inventive scope being defined in the appended claims.

The invention claimed is:

1. A workpiece positioning apparatus, for positioning and supporting a workpiece for work thereon as desired, comprising:
   (a) a chuck member having a rotatable holder for supporting said workpiece;
   (b) a base guideway member for mounting the positioning apparatus in position adjacent a grinder and having a guideway portion thereon;
   (c) a movable mounting means having a slide portion thereon in engagement with said guideway portion for guiding the mounting means along the base member;
   (d) means mounting said chuck member on said mounting means for pivotal movement about an axis transverse to the direction of the guideway portion and through an angle of substantially 90° for positioning and supporting a workpiece held in the rotatable holder between a horizontally and a vertically disposed position;
   (e) means on the base guideway member engageable with a first surface of the chuck member for adjustably positioning the axis of the chuck member in a vertical position;

(f) means on the movable mounting means engageable with a second surface of the chuck member for adjustably positioning the axis of the chuck member in a horizontal position;

(g) positioning means adjustably mounted on the apparatus for engaging and positioning said workpiece during operations thereon; and (h) indexing means carried by the chuck member for rotatably positioning said rotatable holder so that several surfaces of said workpiece can be worked sequentially.

2. In a workpiece positioning apparatus as described in claim 1, said chuck member comprising:

a chuck block members, having apertures therein, a chuck holder positioned within the chuck block member, antifriction bearing means rotatably supporting the chuck holder in the chuck block member, a workpiece holding chuck positioned in the chuck holder with the axis of the chuck extending coaxial with the axis of rotation of the chuck holder and normal to the pivot axis of the chuck member, means connecting the chuck with the chuck holder for rotation therewith and, actuating means connected with the chuck for opening and closing it.

3. In a workpiece positioning apparatus as described in claim 1, said movable mounting means comprising:

rigid side members, the means mounting the chuck member on the movable mounting means including a cylindrical shaft fixed on the chuck member and means rotatably mounting the shaft in said rigid side members, the movable mounting means having apertures formed in the lower surface thereof, and roller means carried by the movable mounting means and located in the apertures, said roller means engaging a smooth upper surface formed on the base guideway so as to permit easy movement of said movable mounting means along said base guideway member.

4. In a workpiece positioning apparatus as described in claim 1, said base guideway member comprising:

a rear stop portion, on said base portion, which serves as a stop for said movable mounting means and which carries the means for adjustably positioning the axis of the chuck member in a vertical position.

5. In a workpiece positioning apparatus as described in claim 1, said positioning means comprising:

a support member adjustably mounted on the base guideway, and a head member adjustably mounted on the support member.

6. In a workpiece positioning apparatus as described in claim 2, said indexing means comprising:

a plurality of radial passages extending inwardly around the periphery of the rotatable chuck holder and disposed in a plane normal to the axis thereof, a radial opening formed in the chuck block in alignment with the radial passages, and an index key slidably mounted in the radial opening of the chuck block and slidably engageable in a selected one of the radial passages.

7. A workpiece positioning apparatus as described in claim 1, further comprising: a cylindrical leg fixed to the chuck member and spaced from and parallel to the means mounting said chuck member for pivotal movement.

a sine bar member, seated on a forward portion of said movable mounting means, so that said movable chuck member may be supported thereby by resting said cylindrical leg thereon for positioning the axis of the rotatable holder at an incline to the horizontal plane.

8. A workpiece positioning apparatus as described in claim 1, further comprising:

a support bar adjustably mounted in the chuck member and engageable with the outer end of a workpiece held in the rotatable holder for supporting said workpiece so as to prevent undesirable movement and wobbling of said workpiece during the working thereon.

9. In a workpiece positioning apparatus as described in claim 1, said means on the movable mounting means engageable with a second surface of the chuck member comprising a block member on the top surface thereof, which is smooth and flat on its upper surface, and which is engageable with the second surface of the chuck member to serve as a level rest for said chuck member and to position the axis of the rotatable holder in a horizontal plane.

10. In a workpiece positioning apparatus as described in claim 3, said movable mounting means further comprising a pad member on the front portion thereof, for cleaning off the top surface of the guideway portion as it moves therealong.

11. In a workpiece positioning apparatus as described in claim 1, said movable mounting means further comprising fixing means, for fixedly locking said movable mounting means to said base guideway member.

References Cited

UNITED STATES PATENTS

| 2,401,874 | 6/1946 | Kilbride | 51—216UX |
| 1,376,953 | 5/1921 | Lindholm | 51—225 |
| 2,414,285 | 1/1947 | Bloominburg | 51—225 |
| 3,298,141 | 1/1967 | Daubitz | 51—216 |
| 3,365,843 | 1/1968 | Robinson | 51—225 |
| 2,574,112 | 11/1951 | Kopec | 51—232 |

HAROLD D. WHITEHEAD, Primary Examiner